(12) United States Patent
Mar

(10) Patent No.: US 6,737,998 B1
(45) Date of Patent: May 18, 2004

(54) METHOD AND DEVICE FOR CORRECTING SIGNAL

(75) Inventor: William Mar, Taipei (TW)

(73) Assignee: Via Technologies, Inc. (TW)

( * ) Notice: Subject to any disclaimer, the term of this patent is extended or adjusted under 35 U.S.C. 154(b) by 0 days.

(21) Appl. No.: 10/436,041

(22) Filed: May 12, 2003

(30) Foreign Application Priority Data

May 29, 2002 (TW) ..................................... 091111420 A

(51) Int. Cl.⁷ ............................................. H03M 13/00
(52) U.S. Cl. .............................. 341/94; 341/58; 341/59; 714/786; 714/792; 375/209; 375/206; 360/48; 360/53
(58) Field of Search ............................ 341/94, 58, 59; 360/48, 53; 375/209, 206, 296; 714/786, 792, 794

(56) References Cited

U.S. PATENT DOCUMENTS

| | | | | |
|---|---|---|---|---|
| 4,945,538 A | * | 7/1990 | Patel ........................... | 714/786 |
| 5,095,484 A | * | 3/1992 | Karabed et al. ............... | 341/94 |
| 6,144,324 A | * | 11/2000 | Sasaki ........................... | 341/94 |
| 6,154,870 A | * | 11/2000 | Fredrickson et al. ........... | 341/94 |
| 6,166,667 A | * | 12/2000 | Park ............................... | 341/94 |
| 6,400,290 B1 | * | 6/2002 | Langhammer et al. ......... | 341/94 |
| 6,417,788 B1 | * | 7/2002 | McEwen et al. ............... | 341/94 |
| 6,617,985 B1 | * | 9/2003 | Poeppelman .................. | 341/94 |
| 6,664,904 B2 | * | 12/2003 | Mar et al. ..................... | 341/94 |

OTHER PUBLICATIONS

Ascheid, Gerd, et al., "An All Digital Receiver Architecture for Bandwidth Efficient Transmission at High Data Rates." IEEE Transactions on Communications, vol. 37, No. 8, Aug., 1989, pp. 804–812.

Farrow, C.W., "A Continuously Variable Digital Delay Element," IEEE, 1988, pp. 2641–2645.

Schafer, Ronald W., et al., "A Digital Signal Processing Approach to Interpolation," Proceedings of the IEEE, vol. 61, No. 6, Jun., 1973, pp. 692–702.

\* cited by examiner

Primary Examiner—Michael Tokar
Assistant Examiner—Lam Mai
(74) Attorney, Agent, or Firm—Madson & Metcalf

(57) ABSTRACT

A method for correcting an analog signal to target levels is provided. Firstly, the analog signal is periodically sampled to obtain a plurality of sampled points. Then, levels of the sampled points are compared with a threshold value to find a set of sequentially sampled points including a head and a tail ones, each having a first comparing result with the threshold value, and the other intermediate ones, each having a second comparing result with the threshold value. Then, one of the set of sequentially sampled points, which has the second comparing result with the threshold value, is adjusted to one of the target levels. A device for correcting an analog signal to target levels is also provided.

20 Claims, 6 Drawing Sheets

METHOD AND DEVICE FOR CORRECTING SIGNAL

FIELD OF THE INVENTION

The present invention relates to a method and a device for correcting a signal, and more particularly to a method and a device for correcting an analog signal outputted from a partial response channel to target levels.

BACKGROUND OF THE INVENTION

Optical disks such as compact disks (CDs), video compact disks (VCDs) and digital versatile disk (DVDs) are played by recording and reproducing devices such as VCD or DVD players. In a typical digital data recording and reproducing system of FIG. 1, a digital data sequence u is encoded by an error control encoder 11 and then modulated by a modulator 12 so as to be modified as a recording signal x. The recording signal x is suitable to be written into a digital data recording medium 10 by means of a write-in device 13, and read out by a pickup head 14. The signal read by the pickup head 14 is processed by an equalizer 15 into a signal y, and then the equalized signal y is processed by a detector 16 according to a sequential maximum likelihood algorithm into a read-out signal x' in the same format as that of the recording signal x. The maximum likelihood algorithm, which is usually implemented as a Viterbi decoder, is well known in the art and need not be further described in detail herein. The read-out signal x' is subsequently demodulated and decoded by a demodulator 17 and an error control decoder 18, respectively, so as to obtain a recovered data sequence u'. Generally, the equalizer 15, the detector 16, the demodulator 17 and the error control decoder 18 are incorporated in a control chip of an optical disk drive.

The procedures for converting the recording signal x into the signal y will be illustrated in reference to FIGS. 2 and 3. In FIG. 2, the means for processing the recording signal x prior to entering the equalizer 15 can be simplified as a channel 20 The transfer function between the input/output signals x and z of the channel 20 is referred to as $Z(D)/X(D)=1+a_1*D+a_2*D^2+a_3*D^3+a_4*D^4+ \ldots +a_{n-1}*D^{n-1}$ in a form of polynomial, where D is a delay time. The equalizer 15 is employed to remove some items of higher power in the polynomial, and thus the channel 20 and the equalizer 15 are viewed as an integrated partial response channel. For this partial response channel, a transfer function, for example PR(1,1), PR(1,2,1) or PR(1,1,1,1), can be applied for the transfer from the signal x to the signal y. The transfer function PR(1,1) indicates $Y(D)/X(D)=1+D$ with target levels of −1, 0 and 1. The transfer function PR(1,2,1) indicates $Y(D)/X(D)=1+2*D+D^2$ with target levels of −2, −1, 1 and 2. The transfer function PR(1,1,1,1) indicates $Y(D)/X(D)=1+D+D^2+D^3$ with target levels of −2, −1, 0, 1, 2.

The function PR(1,1) is unsatisfactory for being applied to real products because the noise cannot be effectively filtered out. Although the function PR(1,1,1,1) can result in good performance of the partial response channel, the cost thereof is relatively high. Thus, the function PR(1,2,1) is discussed hereinafter.

FIGS. 3(a) to 3(c) are timing waveform diagrams illustrating the corresponding signals processed in the partial response channel based on the transfer function PR(1,2,1). As shown in FIG. 3(a), the recording signal x consists essentially of levels 0.5 and +0.5. The ideal waveform of the signal y, i.e. $y_{id}$, after being processed by the partial response channel on the basis of the transfer function PR(1,2,1), i.e. $Y(D)/X(D)=1+2*D+D^2$, is shown in FIG. 3(b). The signal is supposed to be distributed at target levels of −2, 1, 1 and 2. However, the waveform of the signal y is practically somewhat drifted from the ideal target levels due to the mismatch between ideal partial response channel and real one. The real waveform of the signal y. i.e. $y_{real}$, can for example be seen in FIG. 3(c).

As shown, in spite of precise location on the four target levels −2, −1, 1, 2 for most of the sampled points, some sampled points are drifted from the target levels. Particularly for three sequential sampled points respectively in response to three sampling cycles, which are so-called as 3T sampled points and for example include sampled points a, b and c as shown in FIG. 3(c), the middle sampled point b is possibly greatly deviated from its target level −2 due to the significant variation during a short period of time. Under this circumstance, a mismatch problem occurs. When the mismatched signal y from the partial response channel is sent to the detector 16, the read-out signal x' may not be recovered to its original state as the recording signal x by a maximum likelihood algorithm.

SUMMARY OF THE INVENTION

It is an object of the present invention to provide a method and a device for correcting an analog signal from a partial response channel, which effectively locate three sequential and then correct the middle sampled point to a target level.

In accordance with an aspect of the present invention, there is provided a method for correcting an analog signal to target levels. The analog signal is transmitted from a partial response channel and comprises a plurality of periodically sampled points. The method for correcting an analog signal to target levels comprising steps of picking up three sequentially sampled points according to a specified criterion, and adjusting a middle one of the three sequentially sampled points to one of the target levels.

In an embodiment, the analog signal is a radio frequency (RF) signal.

In an embodiment, the analog signal is obtained by $Y(D)=X(D)*(1+2*D+D^2)$, where D is a delay time, and X(D) is an input of the partial response channel. The analog signal is to be corrected into four target levels −2, −1, 1 and 2.

In an embodiment, the three sequentially sampled points have respective levels less than a threshold value, immediately follow one sampled point having a level greater than the threshold value, and are followed by one sampled point having a level greater than the threshold value. The middle one of the three sequentially sampled points is adjusted to a smallest one of the target levels. Preferably, the threshold value is "0", and the smallest target level is "−2".

Alternatively, the three sequentially sampled points have respective levels greater than a threshold value, immediately follow one sampled point having a level less than the threshold value, and are followed by one sampled point having a level less than the threshold value. The middle one of the three sequentially sampled points is adjusted to a largest one of the target levels. Preferably, the threshold value is "0", and the largest target level is "2".

In accordance with another aspect of the present invention, there is provided a method for correcting an analog signal to target levels. Firstly, the analog signal is periodically sampled to obtain a plurality of sampled points. Then, levels of the sampled points are compared with a threshold value to find a set of sequentially sampled points including a head and a tail ones, each having a first comparing result with the threshold value, and the other intermediate ones, each having a second comparing result with the threshold value. Then, one of the set of sequentially sampled points, which has the second comparing result with the threshold value, is adjusted to one of the target levels.

In an embodiment, the set of sequentially sampled points includes five consecutive sampled points.

In an embodiment, the first comparing result indicates that the level of each of the head and tail sampled points is greater than the threshold value, and the second comparing result indicates that the level of each of the intermediate sampled points is less than the threshold value. The step of adjusting one of the set of sequentially sampled points is performed by adjusting a middle one of the intermediate sampled points to a smallest one of the target levels.

Alternatively, the first comparing result indicates that the level of each of the head and tail sampled points is less than the threshold value, and the second comparing result indicates that the level of each of the intermediate sampled points is greater than the threshold value. The step of adjusting one of the set of sequentially sampled points is performed by adjusting a middle one of the intermediate sampled points to a largest one of the target levels.

In accordance with another aspect of the present invention, there is provided a device for correcting an analog signal into target levels for use with a partial response channel. The device comprises a delay unit, a first comparator, a second comparator and a correcting circuit. The delay unit includes a head delay element, a plurality of intermediate delay elements and a tail delay element electrically connected in series, and each receiving the analog signal and delaying sampled points by a certain time period. The first comparator is in communication with the head and the intermediate delay elements for comparing levels of first sampled points outputted by the head and the intermediate delay elements with a threshold value, and outputting a first triggering signal in response to a first comparing result. The second comparator is in communication with the partial response channel and the tail delay element for comparing levels of second sampled points outputted by the partial response channel and the tail delay element with a threshold value, and outputting a second triggering signal in response to a second comparing result. The correcting circuit is in communication with a middle one of the intermediate delay elements, the first comparator and the second comparator for adjusting the sampled point outputted by the middle one of the intermediate delay elements to one of the target levels in response to the simultaneous occurrence of the first and the second triggering signals.

In an embodiment, the delay unit includes four delay elements, and the correcting circuit is electrically connected to a second one of the five delay elements.

In an embodiment, the first comparing result indicates that the level of each of the first sampled points is greater than the threshold value, and the second comparing result indicates that the level of each of the second sampled points is less than the threshold value. The correcting circuit adjusts the sampled point outputted by the middle one of the intermediate delay elements to a smallest one of the target levels. Preferably, the threshold value is "0", and the target level is "−2". Alternatively, the first comparing result indicates that the level of each of the first sampled points is less than the threshold value, and the second comparing result indicates that the level of each of the second sampled points is greater than the threshold value. The correcting circuit adjusts the point outputted by the middle one of the intermediate delay elements to one of the target levels. Preferably, the threshold value is "0", and the target level is "2".

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
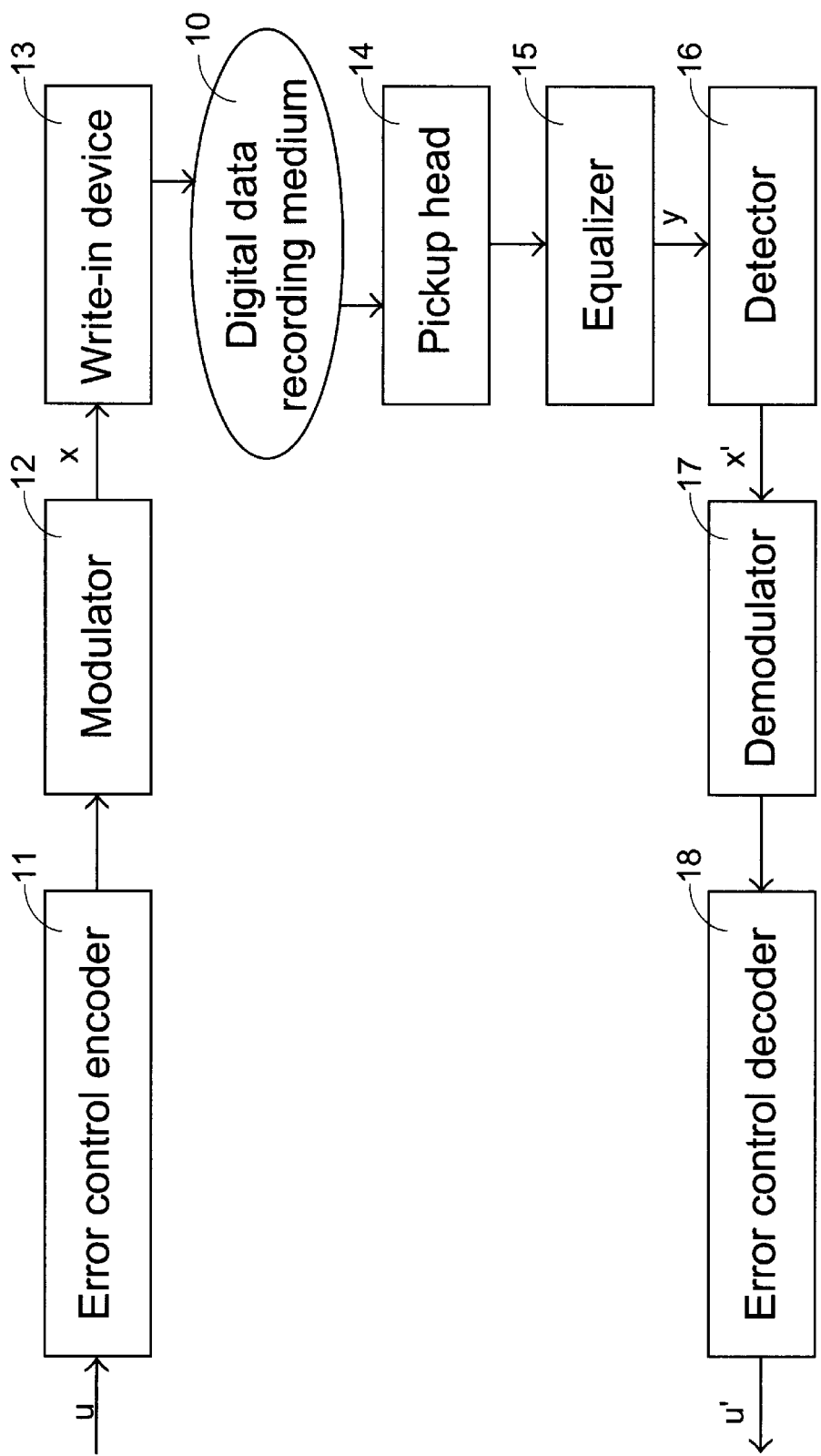
FIG. 1 is a circuit block diagram illustrating a conventional digital data recording and reproducing system.
Figure 4:
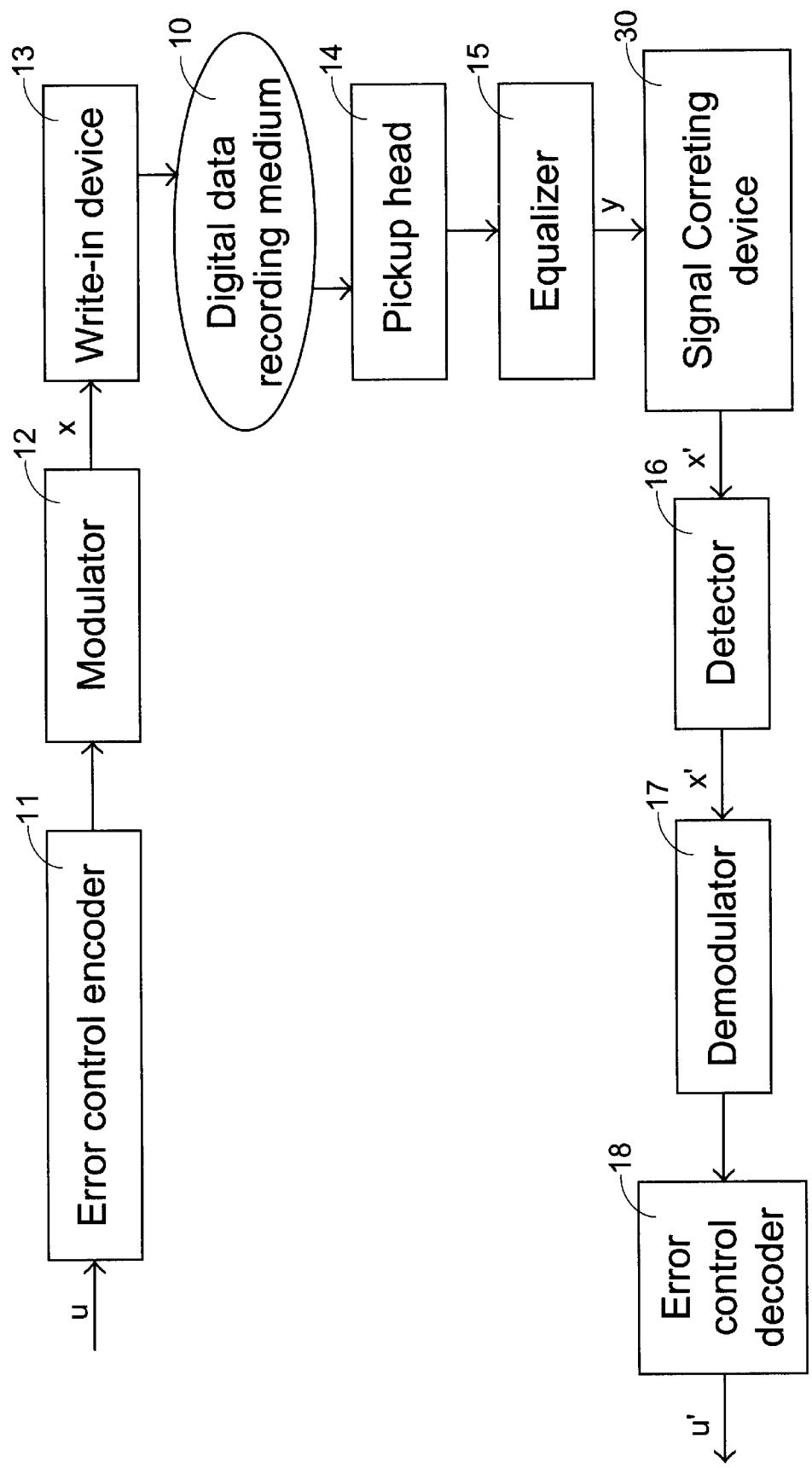
FIG. 4 is a functional block diagram illustrating a digital data recording and reproducing system according to a preferred embodiment of the present invention.

Please refer to FIG. 4, which illustrates a digital data recording and reproducing system according to a preferred embodiment of the present invention. The elements corresponding to those in FIG. 1 will be designated by identical numeral references. The digital data recording and reproducing system of FIG. 4 comprises an error control encoder 11, a modulator 12, a write-in device 13, a digital data recording medium 10, a pickup head 14, an equalizer 15, a detector 16, a demodulator 17, an error control decoder 18 and additionally a signal correcting device 30. The operation of this system will be further illustrated as follows.

Figure 2:
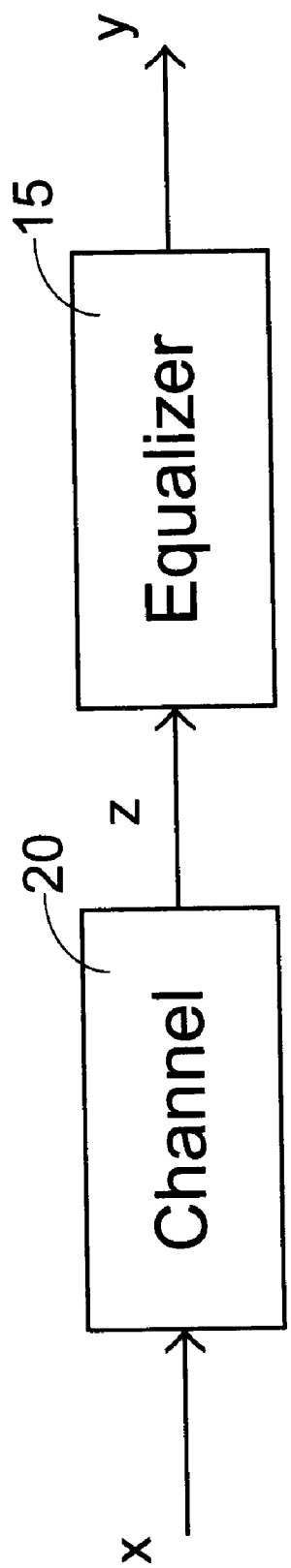
FIG. 2 is a circuit block diagram illustrating an integrated partial response channel.
Figure 3A:
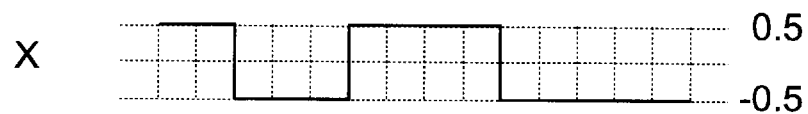
FIG. 3(a) is a timing waveform diagram illustrating an input signal to be processed by the partial response channel.
Figure 3B:
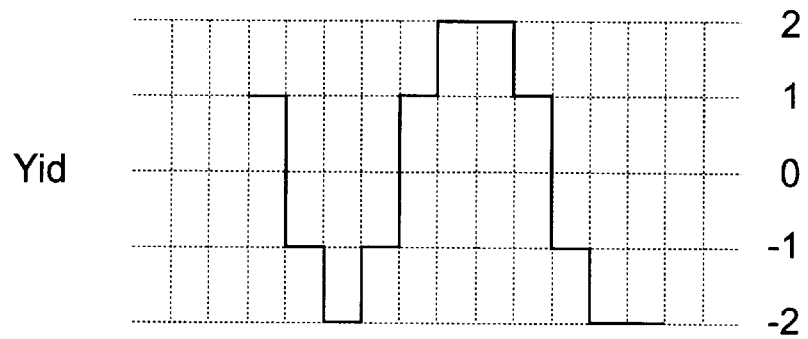
FIG. 3(b) is a timing waveform diagram illustrating an ideal output signal processed by the partial response channel based on the transfer function PR(1,2,1)
Figure 3C:
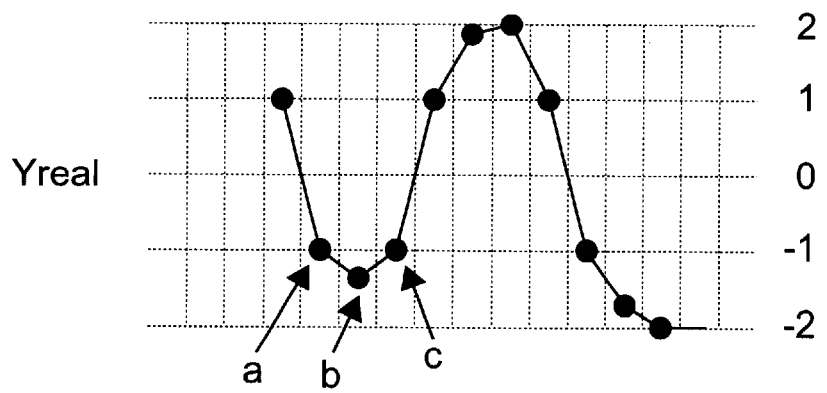
FIG. 3(c) is a timing waveform diagram illustrating a real output signal having been processed by the partial response channel based on the transfer function PR(1,2,1)

A digital data sequence u is encoded by the error control encoder 11 and then modulated by the modulator 12 so as to be modified as a recording signal x. The recording signal x is written into the digital data recording medium 10 by means of the write-in device 13, and read out by the pickup head 14. The signal read by the pickup head 14 is processed by the equalizer 15 into an analog signal y. For an optical disk, the analog signal y can be a radio frequency (RF) signal. The means for processing the recording signal x prior to entering the equalizer 15 can be simplified as a channel, and the channel and the equalizer 15 are viewed as an integrated partial response channel, as shown in FIG. 2. In this embodiment, the recording signal x is processed by the partial response channel on the basis of the transfer function PR(1,2,1), i.e. $Y(D)/X(D) = 1+2*D+D^2$. The signal correcting device 30 is used for correcting the analog signal y into target levels according to a signal correcting method of the present invention, as will be described hereinafter.

As previously described, the middle sampled point of 3T sampled points is possibly greatly deviated from its target level due to the significant variation during a short period of time. Therefore, the signal correcting method of the present invention provides a criterion for picking up three sequentially sampled points, the middle one of which is corrected. According to the criterion, these three sequentially sampled points should have respective levels less than a threshold value, immediately follow one sampled point having a level greater than the threshold value, and are followed by one sampled point having a level greater than the threshold value. Then, the middle one of the three sequentially sampled points will be adjusted to a smallest one of the target levels. Alternatively, these three sequentially sampled points should have respective levels less than a threshold value, immediately follow one sampled point having a level greater than the threshold value, and are followed by one sampled point having a level greater than the threshold value. Then, the middle one of the three sequentially sampled points is adjusted to a largest one of the target levels. Examples will be described with reference to FIGS. 5(a) and 5(b).

Figure 5A:
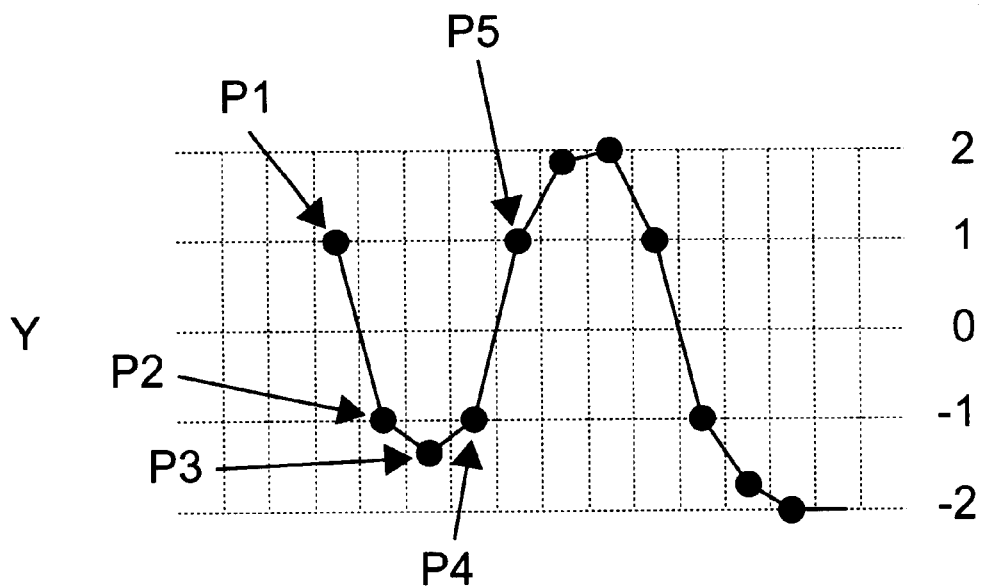
FIGS. 5(a) and 5(b) schematically show uncorrected and corrected analog signals having been processed by the partial response channel based on the transfer function PR(1,2.1) according to the present invention.
Figure 5B:
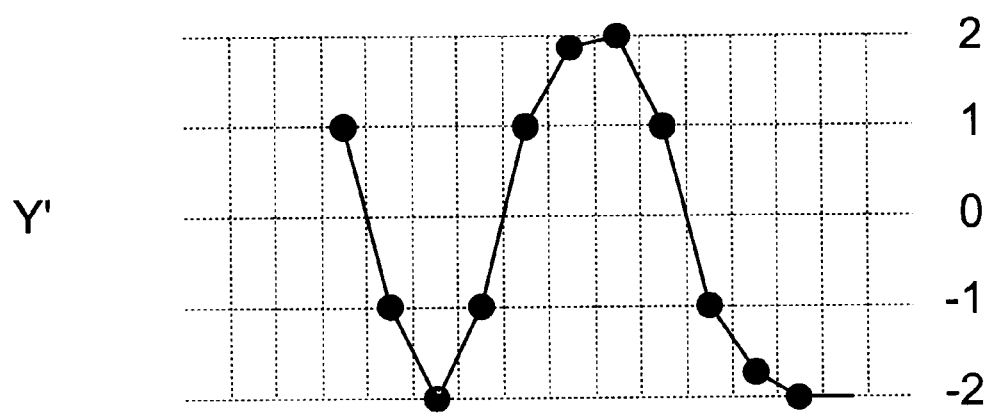

As shown in FIG. 5(a), the first five sampled points P1~P5 comply with the criterion. In this example, the PR(1,2,1) transfer function is applied, and the target levels are −2, −1, 1 and 2. The threshold value is set to be "0". Each of the sampled points P1 and P5 has a level of "1" which is greater than the threshold value "0", and the 3T sampled points P2~P4 have respective levels less than the threshold value "0". It is apparent that each of the second and the fourth sampled points P2 and P4 is on the target level "−1", but the third sampled point P3, i.e. the middle sampled point is beyond any of the target levels. The middle sampled point P3, therefore should be adjusted to the smallest target level "−2" by means of the signal correcting device 30, as can be seen in FIG. 5(b). Likewise, if the sampled points P1 and P5 are less than the threshold value "0" and the 3T sample points P2~P4 have respective levels greater than the threshold value "0", the middle sampled point P2 will be adjusted to the largest target level "2" by means of the signal correcting device 30.

Figure 6:
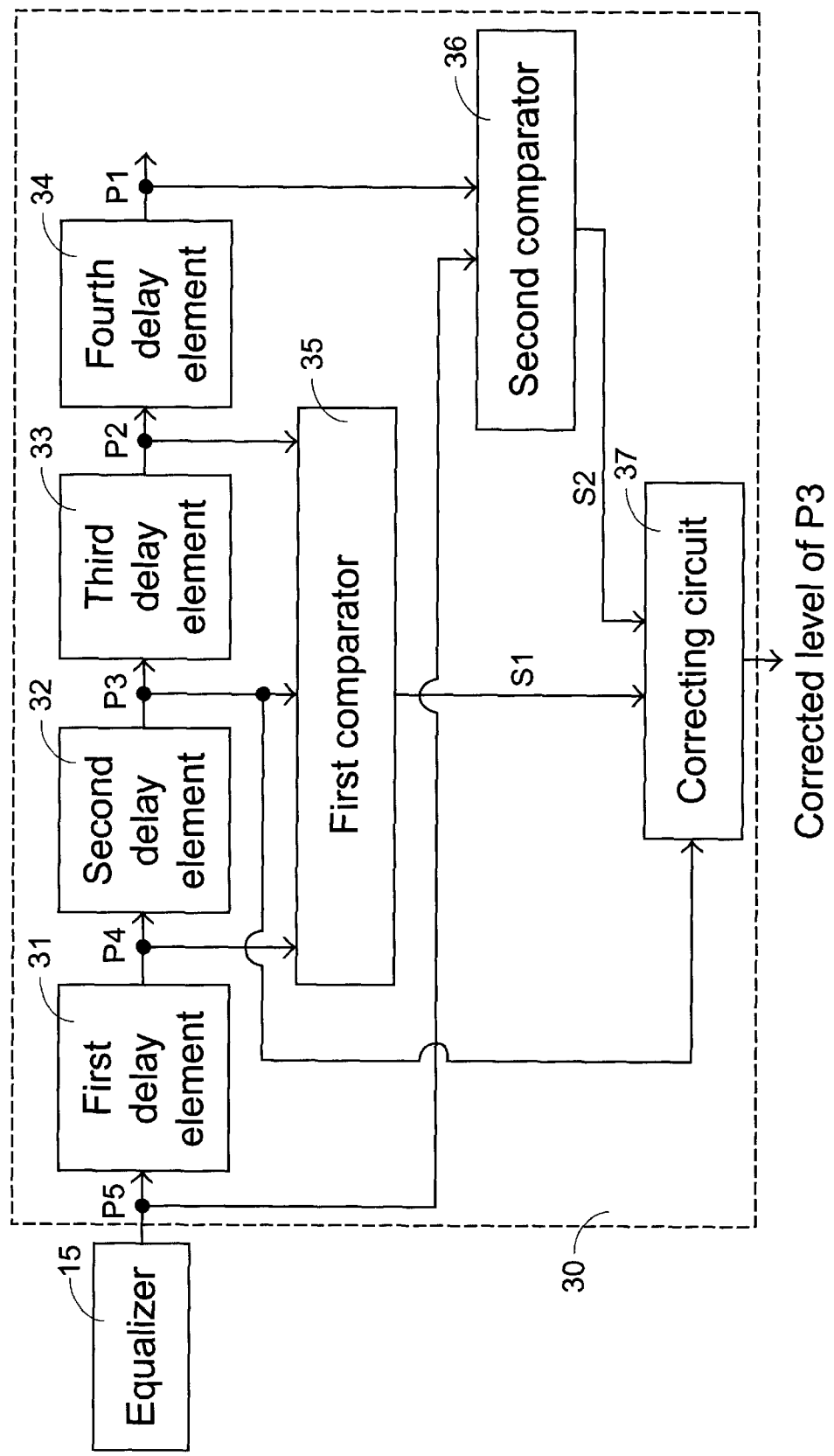
FIG. 6 is a schematic circuit block diagram illustrating an embodiment of the signal correcting device of FIG. 4.

In order to be best understood, the configuration of the signal correcting device 30 for implementing the above example is further referred to FIG. 6. The signal correcting device 30 comprises a first delay element 31, a second delay element 32, a third delay element 33, a fourth delay element 34, a first comparator 35, a second comparator 36 and a correcting circuit 37.

The delay elements 31~34 are electrically connected with the equalizer 15 in series, and each delay element receives the analog signal and delays sampled points by a certain time period T. The first comparator 35 is electrically connected to output ends of the first delay element 31, the second delay element 32 and the third delay element 33. The second comparator 36 is electrically connected to output ends of the equalizer 15 and the fourth delay element 34. The correcting circuit 37 is electrically connected to output ends of the second delay element 32, the first comparator 35 and the second comparator 36. In other words, the first comparator 35 realizes the levels of the sampled points P2, P3 and P4, and the second comparator 36 realizes the levels of the sampled points P1 and P5.

When the levels of the sampled points P4, P3 and P2 respectively from output ends of the delay element 31~33 are less than the threshold value "0", the first comparator 35 outputs a first triggering signal S1 to the correcting circuit 37. In addition, when the levels of the sampled points P5 and P1 respectively from output ends of the equalizer 15 and the fourth delay element 34 are greater than the threshold value "0", the second comparator 36 outputs a second triggering signal S2 to the correcting circuit 37. The correcting circuit 37 is further electrically connected to the second delay element 32 for receiving the data of the sampled point P3. In response to the simultaneous occurrence of the first triggering signal S1 and the second triggering signal S2, the correcting circuit 37 adjusts the level of the sampled point P3 outputted by the second delay element 32 to the target level "−2" (i.e. the waveform shown in FIG. 5(a) is currently adjusted).

Likewise, when the levels of the sampled points from output ends of the delay element 31~33 are greater than the threshold value "0" and the levels of the sampled points from output ends of the equalizer 15 and the fourth delay element 34 are less than the threshold value "0", the first comparator 35 and the second comparator 36 could output the first triggering signal S1 and second triggering signal S2, respectively. In response to the simultaneous occurrence of the first triggering signal S1 and the second triggering signal S2, the correcting circuit 37 adjusts the sampled point outputted by the second delay element 32 to the target level "2".

It is known that the mismatch problem could be greatly overcome by using the method and the device of the present invention because the mismatched analog signal y is corrected into a signal y' with sampled points distributed on target levels. The corrected signal y' is then processed by the detector 16 according to a maximum likelihood algorithm into a read-out signal x' in the same format as that of the recording signal x. The read-out signal x' is subsequently demodulated and decoded by the demodulator 17 and the error control decoder 18, respectively, so as to obtain a recovered data sequence u'. Since the signal y' has been properly corrected, a data sequence u' is even accurately recovered. Please note that the correcting circuit 37 can be established by using combinational circuits. An ordinary person having skills in the art may implement the correcting circuit 37 as applications and requirements.

The present invention is illustrated by referring to a partial response channel on the basis of the transfer function PR(1,2,1). Nevertheless, the transfer function PR(1,1) or PR(1,1,1,1) can also be applied to the digital data recording and reproducing system of the present invention. In addition, although 3T sampled points are exemplified herein for illustration, the present invention is also applicable to correct for example 5T or other sampled points. Furthermore, the equalizer 15, the detector 16, the demodulator 17 and the error control decoder 18 can be incorporated in a control chip of an optical disk drive.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for correcting an analog signal to target levels, said analog signal being transmitted from a partial response channel and comprising a plurality of periodically sampled points, said method comprising steps of:

picking up three sequentially sampled points according to a specified criterion; and adjusting a middle one of said three sequentially sampled points to one of said target levels.

2. The method according to claim 1 wherein said analog signal is a radio frequency (RF) signal.

3. The method according to claim 1 wherein said analog signal is obtained by $Y(D)=X(D)*(1+2*D+D^2)$, where D is a delay time, and $X(D)$ is an input of said partial response channel.

4. The method according to claim 3 wherein said analog signal is to be corrected into four target levels −2, −1, 1 and 2.

5. The method according to claim 1 wherein said three sequentially sampled points have respective levels less than a threshold value, immediately follow one sampled point having a level greater than said threshold value, and are followed by one sampled point having a level greater than said threshold value.

6. The method according to claim 5 wherein said middle one of said three sequentially sampled points is adjusted to a smallest one of said target levels.

7. The method according to claim 1 wherein said three sequentially sampled points have respective levels greater than a threshold value, immediately follow one sampled point having a level less than said threshold value, and are followed by one sampled point having a level less than said threshold value.

8. The method according to claim 7 wherein said middle one of said three sequentially sampled points is adjusted to a largest one of said target levels.

9. A method for correcting an analog signal to target levels, comprising steps of:

periodically sampling said analog signal to obtain a plurality of sampled points; comparing levels of said sampled points with a threshold value to find a set of sequentially sampled points including a head and a tail ones, each having a first comparing result with said threshold value, and the other intermediate ones, each having a second comparing result with said threshold value; and adjusting one of said set of sequentially sampled points, which has said second comparing result with said threshold value, to one of said target levels.

10. The method according to claim 9 wherein said set of sequentially sampled points includes five consecutive sampled points.

11. The method according to claim 9 wherein said first comparing result indicates that the level of each of said head and tail sampled points is greater than said threshold value, and said second comparing result indicates that the level of each of said intermediate sampled points is less than said threshold value.

12. The method according to claim 11 wherein said step of adjusting one of said set of sequentially sampled points is performed by adjusting a middle one of said intermediate sampled points to a smallest one of said target levels.

13. The method according to claim 9 wherein said first comparing result indicates that the level of each of said head and tail sampled points is less than said threshold value, and said second comparing result indicates that the level of each of said intermediate sampled points is greater than said threshold value.

14. The method according to claim 13 wherein said step of adjusting one of said set of sequentially sampled points is performed by adjusting a middle one of said intermediate sampled points to a largest one of said target levels.

15. A device for correcting an analog signal into target levels for use with a partial response channel comprising:

a delay unit including a head delay element, a plurality of intermediate delay elements and a tail delay element coupled in series, and each receiving said analog signal and delaying sampled points by a certain time period;

a first comparator in communication with said head and said intermediate delay elements, comparing levels of first sampled points outputted by said head and said intermediate delay elements with a threshold value, and outputting a first triggering signal in response to a first comparing result;

a second comparator in communication with said partial response channel and said tail delay element, comparing levels of second sampled points outputted by said partial response channel and said tail delay element with a threshold value, and outputting a second triggering signal in response to a second comparing result; and a correcting circuit in communication with a middle one of said intermediate delay elements, said first comparator and said second comparator, adjusting said sampled point outputted by said middle one of said intermediate delay elements to one of said target levels in response to the simultaneous occurrence of said first and said second triggering signals.

16. The device according to claim 15 wherein said delay unit includes four delay elements, and said correcting circuit is coupled to a second one of said five delay elements.

17. The device according to claim 15 wherein said first comparing result indicates that the level of each of said first sampled points is greater than said threshold value, and said second comparing result indicates that the level of each of said second sampled points is less than said threshold value.

18. The device according to claim 17 wherein said correcting circuit adjusts said sampled point outputted by said middle one of said intermediate delay elements to a smallest one of said target levels.

19. The device according to claim 15 wherein said first comparing result indicates that the level of each of said first sampled points is less than said threshold value, and said second comparing result indicates that the level of each of said second sampled points is greater than said threshold value.

20. The device according to claim 19 wherein said correcting circuit adjusts said sampled point outputted by said middle one of said intermediate delay elements to a largest one of said target levels.

* * * * *